United States Patent
Centonza et al.

(10) Patent No.: US 11,395,191 B2
(45) Date of Patent: Jul. 19, 2022

(54) TECHNIQUE FOR INTER-SYSTEM HANDOVER

(71) Applicant: Telefonaktiebolaget LM Ericsson (publ), Stockholm (SE)

(72) Inventors: Angelo Centonza, Stockholm (SE); Peter Hedman, Helsingborg (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/495,152

(22) PCT Filed: Nov. 29, 2017

(86) PCT No.: PCT/EP2017/080768
§ 371 (c)(1),
(2) Date: Sep. 18, 2019

(87) PCT Pub. No.: WO2018/171918
PCT Pub. Date: Sep. 27, 2018

(65) Prior Publication Data
US 2020/0037207 A1 Jan. 30, 2020

Related U.S. Application Data

(60) Provisional application No. 62/475,565, filed on Mar. 23, 2017.

(51) Int. Cl.
*H04W 36/00* (2009.01)
*H04W 8/08* (2009.01)
(Continued)

(52) U.S. Cl.
CPC ......... *H04W 36/0022* (2013.01); *H04W 8/08* (2013.01); *H04W 36/0033* (2013.01); *H04W 36/14* (2013.01); *H04W 48/08* (2013.01)

(58) Field of Classification Search
None
See application file for complete search history.

(56) References Cited

U.S. PATENT DOCUMENTS 9,155,032 B2   10/2015   Savolainen et al.
9,693,381 B2    6/2017   Jamadagni et al.
(Continued)

FOREIGN PATENT DOCUMENTS

CN   102972089 A   3/2013
CN   105009678 A   10/2015

OTHER PUBLICATIONS

3rd Generation Partnership Project, "3rd Generation Partnership Project; Technical Specification Group Radio Access Network; Radio Interface Protocol Architecture (Release 13)", Technical Specification, 3GPP TS 25.301 V13.0.0, Dec. 1, 2015, pp. 1-53, 3GPP.

(Continued)

*Primary Examiner* — Lonnie V Sweet
(74) *Attorney, Agent, or Firm* — Coats + Bennett, PLLC

(57) ABSTRACT

A technique for selectively initiating a handover from a source system (510) comprising a first core network, CN, (512) and a first radio access network, RAN, (516) to a target system (530) comprising a second CN (532) and a second RAN (536) is described. As to a method aspect of the technique, it is determined if a control plane interface (520) for the handover is available between the first CN (512) and the second CN (532). Depending on the availability of the control plane interface (520), the handover is selectively initiated.

19 Claims, 9 Drawing Sheets

(51) Int. Cl.
*H04W 36/14* (2009.01)
*H04W 48/08* (2009.01)

(56) References Cited

U.S. PATENT DOCUMENTS

| | | | | |
|---|---|---|---|---|
| 2006/0084423 | A1* | 4/2006 | Bjorken | H04W 24/08 |
| | | | | 455/423 |
| 2007/0021120 | A1 | 1/2007 | Flore et al. | |
| 2008/0311911 | A1 | 12/2008 | Koodli et al. | |
| 2014/0135007 | A1* | 5/2014 | Yu | H04W 24/02 |
| | | | | 455/436 |
| 2014/0370894 | A1* | 12/2014 | Hosdurg | H04W 36/08 |
| | | | | 455/436 |
| 2015/0173111 | A1* | 6/2015 | Agarwal | H04L 63/0884 |
| | | | | 370/329 |
| 2017/0013441 | A1 | 1/2017 | Manik et al. | |
| 2017/0034749 | A1* | 2/2017 | Chandramouli | H04W 72/042 |
| 2018/0295659 | A1* | 10/2018 | Shan | H04W 76/12 |
| 2019/0059052 | A1* | 2/2019 | Nord | H04W 52/0212 |
| 2020/0305054 | A1* | 9/2020 | Zee | H04W 76/11 |

OTHER PUBLICATIONS

3rd Generation Partnership Project, "3rd Generation Partnership Project; Technical Specification Group Radio Access Network; Services Provided by the Physical Layer (Release 13)", Technical Specification, 3GPP TS 25.302 V13.2.0, Mar. 1, 2016, pp. 1-111, 3GPP.

3rd Generation Partnership Project, "3rd Generation Partnership Project; Technical Specification Group Radio Access Network; UTRAN Overall Description (Release 13)", Technical Specification, 3GPP TS 25.401 V13.0.0, Dec. 1, 2015, pp. 1-64, 3GPP.

Samsung, "Inter-RAT Handover with LTE", 3GPP TSG-RAN WG3 Meeting #93, Gothenburg, Sweden, Aug. 22, 2016, pp. 1-5, R3-161610, 3GPP.

China Mobile et al., "Handing of Single Registration Without Nx Support", SA WG2 Meeting #121, Hangzhou, China, May 15, 2017, pp. 1-3, S2-1723063, 3GPP.

Ericsson, "Elaboration of Procedure Inter eNodeB Handover with CN Node Relocation", 3GPP TSG SA WG2 Meeting #59, Helsinki, Finland, Aug. 27, 2007, pp. 1-6, S2-073792, 3GPP.

Mediatek, Inc., "Consistent Use of 5G Core Network", 3GPP TSG-SA WG2 Meeting #120, Busan, Korea, Mar. 27, 2017, pp. 1-11, S2-171897, 3GPP.

LG Electroncs Inc., "Dual Radio Operation with Dual Attach for Inter-RAT Mobility", 3GPP TSG-RAN2 WG2 NR Ad Hoc, Spokane, USA, Jan. 17, 2017, pp. 1-4, R2-1700310, 3GPP.

3rd Generation Partnership Project, "3rd Generation Partnership Project; Technical Specification Group Radio Access Network; Evolved Universal Terrestrial Radio Access Network (E-UTRAN); X2 Application Protocol (X2AP) (Release 13)", Technical Specification, 3GPP TS 36.423 V13.6.0, Jan. 1, 2017, pp. 1-239, 3GPP.

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 14)", Technical Specification, 3GPP TS 36.413 V14.1.0, Jan. 1, 2017, pp. 1-333, 3GPP.

Ericsson, "23.501: Single registration with no Nx interface", SA WG2 Meeting #120, Busan, Korea, Mar. 27, 2017, pp. 1-5, S2-171756, 3GPP.

\* cited by examiner

610

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | PrintableString(SIZE(1..150,...)) | | YES | ignore |
| Served GUMMEIs | | 1..\<maxnoofRATs\> | | The LTE related pool configuration is included on the first place in the list. | GLOBAL | reject |
| >Served PLMNs | | 1..\<maxnoofPLMNs PerMME\> | | | - | |
| >>PLMN Identity | M | | 9.2.3.8 | | - | |
| >Served GroupIDs | | 1..\<maxnoofGroupIDs\> | | | - | |
| >>MME Group ID | M | | OCTET STRING (SIZE(2)) | | - | |
| >Served MMECs | | 1..\<maxnoofMMECs\> | | | - | |
| >>MME Code | M | | 9.2.3.12 | | - | |
| Relative MME Capacity | M | | 9.2.3.17 | | YES | ignore |
| MME Relay Support Indicator | O | | 9.2.1.82 | | YES | ignore |
| Criticality Diagnostics | O | | 9.2.1.21 | | YES | ignore |
| *Inter CN Relocation to 5G Support Indicator* | O | | ENUMERATED (Not Supported,...) | | YES | ignore |

| IE/Group Name | Presence | Range | IE type and reference | Semantics description |
|---|---|---|---|---|
| Serving PLMN | M | | 9.2.3.8 | |
| Equivalent PLMNs | | 0..<maxnoofEPLMNs> | | Allowed PLMNs in addition to Serving PLMN. This list corresponds to the list of "equivalent PLMNs" as defined in TS 24.301 [24]. This list is part of the roaming restriction information. Roaming restrictions apply to PLMNs other than the Serving PLMN and Equivalent PLMNs. |
| >PLMN Identity | M | | 9.2.3.8 | |
| Forbidden TAs | | 0..<maxnoofEPLMNsPlusOne> | | Intra LTE roaming restrictions. |
| >PLMN Identity | M | | 9.2.3.8 | The PLMN of forbidden TACs. |
| >Forbidden TACs | M | 1..<maxnoofForbTACs> | | |
| >>TAC | M | | 9.2.3.7 | The TAC of the forbidden TAI. |
| Forbidden LAs | | 0..<maxnoofEPLMNsPlusOne> | | Inter-3GPP RAT roaming restrictions. |
| >PLMN Identity | M | | 9.2.3.8 | |
| >Forbidden LACs | M | 1..<maxnoofForbLACs> | | |
| >>LAC | M | | OCTET STRING (SIZE(2)) | |
| Forbidden inter RATs | O | | ENUMERATED(ALL, GERAN, UTRAN, CDMA2000, ..., GERAN and UTRAN, CDMA2000 and UTRAN) | Inter-3GPP and 3GPP2 RAT access restrictions. |
| Not supported for Connected mode mobility (handover) | O | | ENUMERATED (ALL, E-UTRAN connected to 5GS) | |

TECHNIQUE FOR INTER-SYSTEM HANDOVER

TECHNICAL FIELD

The present disclosure relates to a technique for selectively initiating a handover from a source system to a target system. More specifically, and without limitation, a method and a device for selectively initiating a core network handover are provided.

BACKGROUND

Mobile telecommunication systems, such as the 3rd Generation Partnership Project (3GPP) Long Term Evolution (LTE), provide radio access to radio devices (e.g., a User Equipment or UE) through base stations, such as the evolved Node B (eNB). Mobility within a Radio Access Network (RAN) comprising multiple base stations, such as the evolved UMTS Terrestrial Radio Access Network (E-UTRAN), can be handled by the RAN, e.g., by means of Radio Resource Control (RRC) signaling.

For mobility between RANs of different telecommunication systems, an inter-system handover is enabled. For example, document US 2007/0021120 A1 describes a handover between an LTE system and an UMTS system.

While the packet-switched user planes of modern mobile telecommunication systems, such as 3GPP LTE, LTE-Advanced (LTE-A), LTE License-Assisted Access (LTE-LAA) and 5G systems, can be readily coupled to a common gateway, there is no mechanism preventing a source RAN of one system to attempt an inter-RAT handover to a target RAN of another system, even if no inter-system handover is enabled for these two systems.

This will result in failed handover attempts and an increased risk for a radio device to go out of coverage until the radio device has reselected another base station or cell of a third system. Such degradation or interruptions in network support impact the end user Quality of Experience (QoE).

SUMMARY

Accordingly, there is a need for a handover technique that is compatible with interworking systems. Alternatively or in addition, there is a need for an inter-system handover technique that reduces or prevents failed handover attempts.

As to one aspect, a method of selectively initiating a handover is provided. The selectively initiated handover is from a source system comprising a first core network, CN, and a first radio access network, RAN, to a target system comprising a second CN and a second RAN. The method comprises a step of determining if a control plane interface for the handover is available between the first CN and the second CN. The method further comprises a step of selectively initiating the handover depending on the availability of the control plane interface.

"Determining if" the control plane interface is available may encompasses "determining whether or not" the control plane interface is available. For example, the determining step may be implemented by determining if the control plane interface for the handover is not available between first CN and the second CN.

The "selectivity" in initiation of the handover may exclude initiating or performing the handover in case the control plane interface is not available.

The "handover" may relate to mobility in a Radio Resource Control (RRC) connected mode. A radio device may be in the RRC mode with the first RAN. The radio device may be any device configured for radio communication with the first RAN and/or for measuring the second RAN.

The first CN and the second CN may be different. E.g., at least a mobility entity of the first CN may be different from a mobility entity of the second CN.

Any feature related to a CN or a RAN (e.g., the control plane interface between the CNs, or a message from or to the first CN or the first RAN) may be realized by the feature related to at least one node of the CN or the RAN. Any step performed or triggered by a CN or a RAN may be realized by the step being performed or triggered by at least one node of the CN or the RAN.

The method may be performed by one or more nodes of the first CN, by one or more nodes of the first RAN or by at least one node of the first CN and at least one node of the first RAN in a distributed manner. A mobility entity (e.g. of the first CN) and/or a base station (e.g., of the first RAN) may perform the method. An instance of the method may be performed by each base station of the first RAN.

The radio device may be any device configured for accessing the first and second RANs. The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Alternatively or in addition, any of the nodes of the first and second RANs may be embodied as a radio access node. Examples for the radio access node may include a base station (e.g., a 3G base station or Node B, 4G base station or eNodeB, or a 5G base station or gNodeB), an access point (e.g., a Wi-Fi access point) and a network controller (e.g., according to Bluetooth, ZigBee or Z-Wave).

The first RAN and/or the second RAN may provide radio access, e.g., according to the Global System for Mobile Communications (GSM), the Universal Mobile Telecommunications System (UMTS), Long Term Evolution (LTE) or New Radio (NR). The technique may be implemented on a Physical Layer (PHY), a Medium Access Control (MAC) layer, a Radio Link Control (RLC) layer and/or a Radio Resource Control (RRC) layer of a protocol stack for the radio access.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., in the source or target system and/or via the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to another aspect, a device for selectively initiating a handover is provided. The selectively initiated handover is from a source system comprising a first core network, CN, and a first radio access network, RAN, to a target system comprising a second CN and a second RAN. The device is configured to perform the method aspect. Alternatively or in addition, the device may comprise a determining unit configured to determine if a control plane interface for the handover is available between the first CN and the second CN. The device may further comprise a selectively initiating unit configured to selectively initiate the handover depending on the availability of the control plane interface.

As to a further device aspect, a device for selectively initiating a handover is provided. The selectively initiated handover is from a source system comprising a first core network, CN, and a first radio access network, RAN, to a target system comprising a second CN and a second RAN. The device comprises at least one processor and a memory. Said memory comprises instructions executable by said at least one processor whereby the device is operative to determine if a control plane interface for the handover is available between the first CN and the second CN. Execution of the instructions further causes the device to be operative to selectively initiate the handover depending on the availability of the control plane interface.

As to a further aspect, a device for selectively initiating a handover is provided. The selectively initiated handover is from a source system comprising a first core network, CN, and a first radio access network, RAN, to a target system comprising a second CN and a second RAN. The device may comprise one or more modules for performing the method aspect. Alternatively or in addition, the device comprises a determination module for determining if a control plane interface for the handover is available between the first CN and the second CN. The device further comprises a selective initiation module for selectively initiating the handover depending on the availability of the control plane interface.

The devices may further include any feature disclosed herein in the context of the method aspect. Particularly, any one of the units and modules, or a dedicated unit or module, may be configured to perform or trigger one or more of the steps of the method aspect.

BRIEF DESCRIPTION OF THE FIGURES

Further details of embodiments of the technique are described with reference to the enclosed drawings, wherein:

FIG. 7 shows a table for a structure of an availability message usable for the signaling of the first implementation of FIG. 6;

FIG. 8 shows a table for a structure of an availability message for a second implementation;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof (e.g. LTE-A or LTE-LAA), Wireless Local Area Network (WLAN) according to the standard family IEEE 802.11 and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
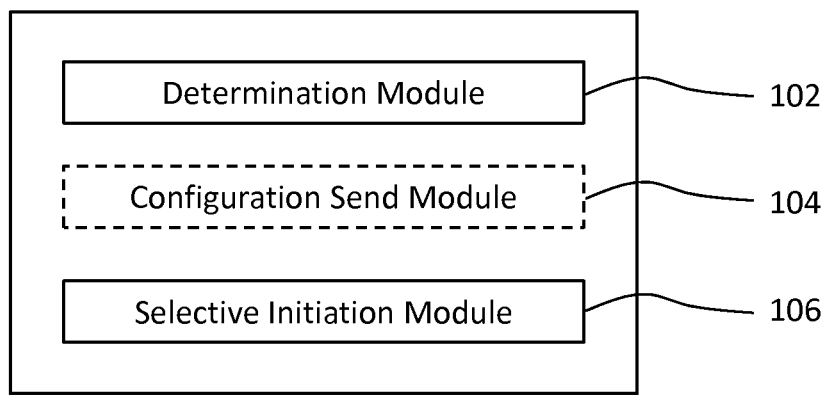
FIG. 1 shows a schematic block diagram for an embodiment of a device for selectively initiating an inter-system handover, which may be implemented in a source core network.

FIG. 1 schematically illustrates a block diagram for an embodiment of a device for selectively initiating a handover from a source system comprising a first core network (CN) and a first radio access network (RAN) to a target system comprising a second CN and a second RAN, which device is generically referred to by reference sign 100.

The device 100 is configured to determine if a control plane interface for the handover is available between the first CN and the second CN. The device 100 is further configured to selectively initiate the handover depending on the availability of the control plane interface.

The handover between the source system and the target system may also be referred to as a CN handover, e.g., as the handover requires signaling between the CNs of the respective systems through the control plane interface. Alternatively or in addition, the handover between the source system and the target system may also be referred to as an inter-system handover, e.g., as the source system and the target system are not identical.

The control plane interface may connect, or may be required to connect, a node of the first CN with a node of the second CN for the handover. Being "required to" may encompass a step that is or would be performed or triggered, or a feature that is or would be present, if (e.g., only if) the handover is or was initiated in the step of selectively initiating the handover, e.g., if the control plane interface is or was available.

At least one of the source system and the target system may comprise at least one of a 3GPP system and a non-3GPP system. The 3GPP system may comprise at least one of a General Packet Radio Service (GPRS), a Universal Mobile Telecommunications System (UMTS), an Evolved Packet System (EPS), a Next Generation System (NGS) and a Fifth Generation System (5GS).

The control plane interface may connect, or may be required to, connect a first mobility entity of the first CN with a second mobility entity of the second CN. At least one of the first mobility entity and the second mobility entity may comprise at least one of a Serving GPRS Support Node (SGSN), a mobility management entity (MME) and an access mobility function (AMF). The control plane interface may include an S3 interface, e.g., for the first and second systems comprising GPRS and EPS systems.

Initiating the handover may include, or may be required to include, sending a handover message indicative of a handover request from the first CN through the control plane interface to the second CN. In order to initiate the handover, the handover message may be sent from the first mobility entity via the control plane interface towards the second mobility entity. The first RAN, e.g., a serving base station of the first RAN, may be in a connected mode with a radio device. The handover message may be indicative of a context of the radio device.

The method may be performed by the first CN or a node (e.g., the first mobility entity) of the first CN. The method may be performed by one or more nodes or entities of the first CN. Performing the method may be realized by performing or triggering (e.g., controlling) the corresponding steps.

Alternatively or in combination, the method may be performed by the first RAN or a node (e.g., the base station serving the radio device) of the first RAN. The method may be performed by one or more nodes or base stations of the first RAN. Performing the method may be realized by performing or triggering (e.g., controlling) the corresponding steps.

Determining the availability of the control plane interface may comprise sending an availability message indicative of the availability to the first RAN. The availability message may be sent by the first CN or the node (e.g., the first mobility entity) of the first CN.

Alternatively or in combination, determining the availability of the control plane interface may comprise receiving the availability message indicative of the availability from the first CN. The availability message may be received by the first RAN or one or more of the nodes (e.g., the serving base station) of the first RAN.

Being "indicative of the availability" may encompass being (e.g., expressly) indicative of positive availabilities (i.e., indicating that the corresponding control plane interface is available), being (e.g., expressly) indicative of negative availabilities (i.e., indicating that the corresponding control plane interface is not available), or both positive and negative availabilities.

The availability message may include a Handover Restriction List (HRL). The HRL may be indicative of the availability. The HRL may be an Information Element (IE), e.g., in accordance with Clause 9.2.3 of 3GPP TS 36.423 (e.g., Version 13.6.0). Alternatively or in addition, the HRL may include a field that is indicative of the one or more target systems or the one or more second RATs for which no control plane interface is available.

The availability message may be a handover request message (e.g., sent to the first RAN or a node thereof when the first RAN or its node is the target of another handover).

The availability message may be sent to at least one node (e.g., base station) of the first RAN. The determination or the selective initiation may include broadcasting one or more availability messages to multiple nodes of the first RAN. Alternatively or in combination, the availability message may be received from at least one node (e.g., mobility entity) of the first CN. The determining step may include collecting or combining availability messages from multiple nodes of the first CN.

The availability message may be sent and/or received upon configuring a RAN interface between the first CN and the first RAN, e.g., a base station of the first RAN. The RAN interface may be within the source system. The RAN interface may be an S1 interface (e.g., within the EPS) or an N2 interface (e.g., within the NGS or 5GS).

The availability message may configure at least one of the first RAN or one or more nodes (e.g., base stations) of the first RAN to selectively send, depending on the determined availability of the control plane interface, a handover required message. The handover required message may be sent to the first CN, e.g., the first mobility entity. The handover required message may be indicative of the target system and/or the second RAN.

The base station may be an evolved Node B (eNodeB or eNB) or a Next Generation Node B (gNodeB or gNB). The base station may be a serving base station of the radio device.

The availability may be determined for a plurality of the target systems. The availability message may be indicative of the availability with respect to the plurality of the target systems, e.g., as a group or individually for each of the target systems.

The availability message may be indicative of the plurality of the target systems (e.g., each of the target systems) by means of a Public Land Mobile Network (PLMN) identifier, e.g., a Mobile Country Code (MCC) and/or a Mobile Network Code (MNC). Optionally, the availability message may be indicative of the availability in terms of pairs of the source system and the target system.

The first RAN may be configured for radio access according to a first radio access technology (RAT). The second RAN may be configured for radio access according to a second RAT. The second RAT may be different from the first RAT. Alternatively or in addition, the handover may relate to an inter-system handover (i.e., the source system and the target system may be different), wherein the RAT may be the same. For example, the second RAT may be equal to, or compatible with, the first RAT.

The availability may be determined for one or more target systems configured for radio access according to the second RAT. The availability message may be indicative of the availability for the second RAT. The availability message may be indicative of the availability in terms of the second RAT (e.g., a type of the second RAT). The availability message may be indifferent (e.g., without distinguishing) between the one or more target systems.

At least one of the first RAT and the second RAT may include at least one of GSM, UMTS, 3GPP Long Term Evolution and 3GPP 5G New Radio. The handover may also be referred to as a S1 handover in the context of 3GPP EPS.

A data plane of the first CN and a data plane of the second CN may include, or may be connected to, the same gateway. The gateway may be a Packet Data Network Gateway (PGW).

Embodiments of the technique may control the first RAN to avoid attempting an inter-system and/or inter-Radio Access Technology (RAT) handover via the first CN, e.g., if there is no interface between the CN nodes of the different RATs or the different source and target systems. Failed handover attempts for a radio device served by the first RAN and loss of coverage for the radio device until it has reselected another RAT or cell can be avoided.

Same of further embodiments may provide seamless network support, e.g., by initiating a handover to another target system with available control plane interface and/or by increasing channel quality for the radio device in the first RAN (e.g., by increasing signal power and/or beamforming gain for the radio device).

The technique can be embodied to improve an end user Quality of Experience (QoE).

FIG. 1 shows a block diagram of an embodiment of a device 100 for selectively initiating a handover from a source system to a target system. The source system comprises a first CN and a first RAN. The target system comprises a second CN and a second RAN. The first CN and second CN are different. The first RAN and second RAN may provide radio access according to the same RAT or different RATs. The device 100 may be implemented at or by the first CN.

The device 100 comprises a determination module 102 that determines, or triggers determining, if a control plane interface for the handover is available between the first CN and the second CN. The device 100 further comprises a selective initiation module 106 that selectively initiates, or triggers selectively initiating, the handover depending on the availability of the control plane interface. If the control plane interface is not available, the handover of a radio device currently served by the first RAN to the second RAN is not initiated or performed.

If the control plane interface for the handover to the target system is not available, the device 100 may perform or trigger any measure for preventing a radio link failure between the first RAN and the served radio device. Optionally, e.g., instead of the handover to the second RAN, an alternative handover to another target system with available control plane interface and/or a measure to improve a channel quality of a radio channel between the first RAN and the served radio device may be initiated or performed.

The device 100, e.g., the module 106, may block a request of the first RAN for the handover from being processed by the first CN. Alternatively or in addition, the device 100 may control the first RAN by means of an availability message to selectively initiate the handover depending on the availability of the corresponding control plane interface for signaling such a handover. The first RAN may be informed by the first CN, if the first CN supports the control plane interface with the second CN of the target system allowing for inter-system (e.g., inter-RAT) handover.

Optionally, the device 100 comprises a configuration send module 104. The availability message may be sent by the configuration send module 104.

For example, the device 100 may configure the first RAN, or at least one node thereof, to not initiate the handover, if the corresponding control plane interface is not available. The availability message may be sent only if the control plane interface is not available. The availability message may configure the first RAN or at least one node of the first RAN, to avoid initiating the handover, as the control plane interface is not available.

In one variant, compatible with any embodiment and implementation, the determination module 102 comprises the configuration send module 104 as a submodule. The availability message may be sent in response to the determination of the availability of the control plane interface. In another variant, compatible with any embodiment and implementation, the selective initiation module 106 comprises the configuration send module 104 as a submodule. That is, the selective initiation module 106 may trigger the selective initiation of the handover by sending the availability message based on the availability resulting from the determination module 102.

Optionally, the selective initiation module 106 may block the initiation of the handover, if a node of the RAN still requests the handover to the target system in the absence of the control plane interface. A node of the RAN may still request the handover, e.g., because the node is incompatible with the availability message, i.e., unable to process the availability message, or if the node has not or not yet received the availability message.

The device 100 may be connected to and/or part of the source system. The device 100 may be embodied by or at a node of the first CN of the source system. The device 100 may be connected to the first CN for controlling an operation of the first CN when initiating the handover.

Each of the first and second RANs may include one or more base stations. The base stations may include a non-3GPP base station (e.g., a ZigBee network controller or a Wi-Fi access point) or a 3GPP radio access node (e.g., a 3G Node B, a 4G eNodeB or a 5G gNodeB).

The radio device may include any radio device configured for a radio-connected mode with at least one of the first RAN and the second RAN. The radio device may include a mobile or portable station (STA, e.g., according to a Wi-Fi), a user equipment (UE, e.g., according to 3GPP) or a device for machine-type communication (MTC, e.g., according to 3GPP or Wi-Fi).

Figure 2:
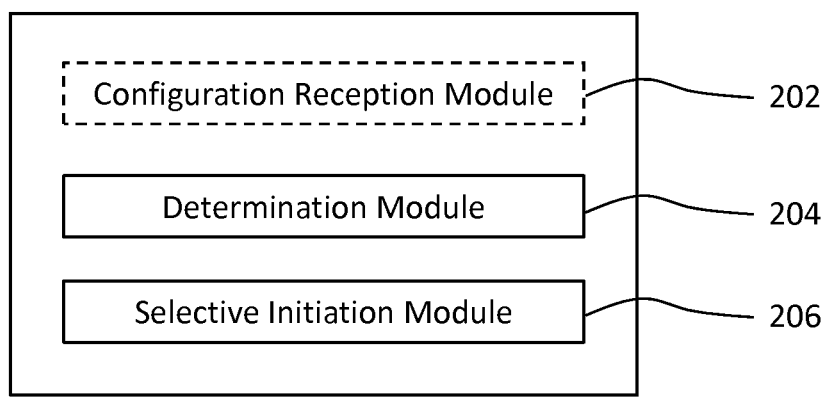
FIG. 2 shows a schematic block diagram for an embodiment of a device for selectively initiating an inter-system handover, which may be implemented in a source access network.

FIG. 2 shows a block diagram of an embodiment of a device 200 for selectively initiating a handover from a source system to a target system. The source system comprises a first CN and a first RAN. The target system comprises a second CN and a second RAN. The first CN and second CN are different. The first RAN and the second RAN may provide radio access according to the same RAT or different RATs. The device 200 may be implemented at or by the first RAN.

The device 200 may be connected to and/or part of the source system. The device 200 may be embodied by or at a base station of the first RAN. The first RAN may include a plurality of base stations. At least one or each of the base stations may comprise an instance of the device 200.

The device 200 comprises a determination module 204 that determines, or triggers determining, if a control plane interface for the handover is available between the first CN and the second CN. The device 200 further comprises a selective initiation module 206 that selectively initiates, or triggers selectively initiating, the handover depending on the availability of the control plane interface. The selectivity may encompass that, if the control plane interface is not available, the handover of a radio device currently served by the first RAN to the second RAN is not initiated or performed.

If the control plane interface for the handover to the target system is not available, the device 200 may perform or trigger any measure for preventing a radio link failure between the first RAN and the served radio device. Optionally, instead of the handover to the second RAN, an alternative handover to another target system with available control plane interface and/or a measure to improve a channel quality of a radio channel between the first RAN and the served radio device may be initiated or performed.

The determination module 204 determines, e.g., in response to an indication for the handover, if the control plane interface for this handover is available at the first CN. The indication of the handover may be a measurement report from the served radio device indicating the handover. For example, the measurement report may indicate that a cell, which belongs to the second RAN and is a neighboring or overlapping cell relative to a serving cell of the first RAN, is an offset better (e.g., in terms of received signal power) than the serving cell of the first RAN.

In one variant, compatible with any embodiment and implementation, the determination module 204 determines the availability based on a configuration stored at the first RAN, e.g., at the device 200. The configuration may be stored (e.g., set or overwritten) according to an availability message indicative of the availability of the control plane interface at the first CN. In another variant, compatible with any embodiment and implementation, the determination module 204 determines the availability by requesting the availability message from the first CN.

The availability message may be received from the first CN. Optionally, the device 200 comprises a configuration reception module 202. The availability message may be received by the configuration reception module 202. While the embodiment of the device 200 in FIG. 2 shows the configuration reception module 202 as a separate module 202, the module 202 may also be implemented as a sub-module, e.g., of the determination module 204.

For example, the availability message may configure the first RAN (or the at least one node thereof including or connected to an instance of the device 200) to not initiate the handover, if the corresponding control plane interface is not available. The availability message may be received only if the control plane interface is not available.

Figure 3:
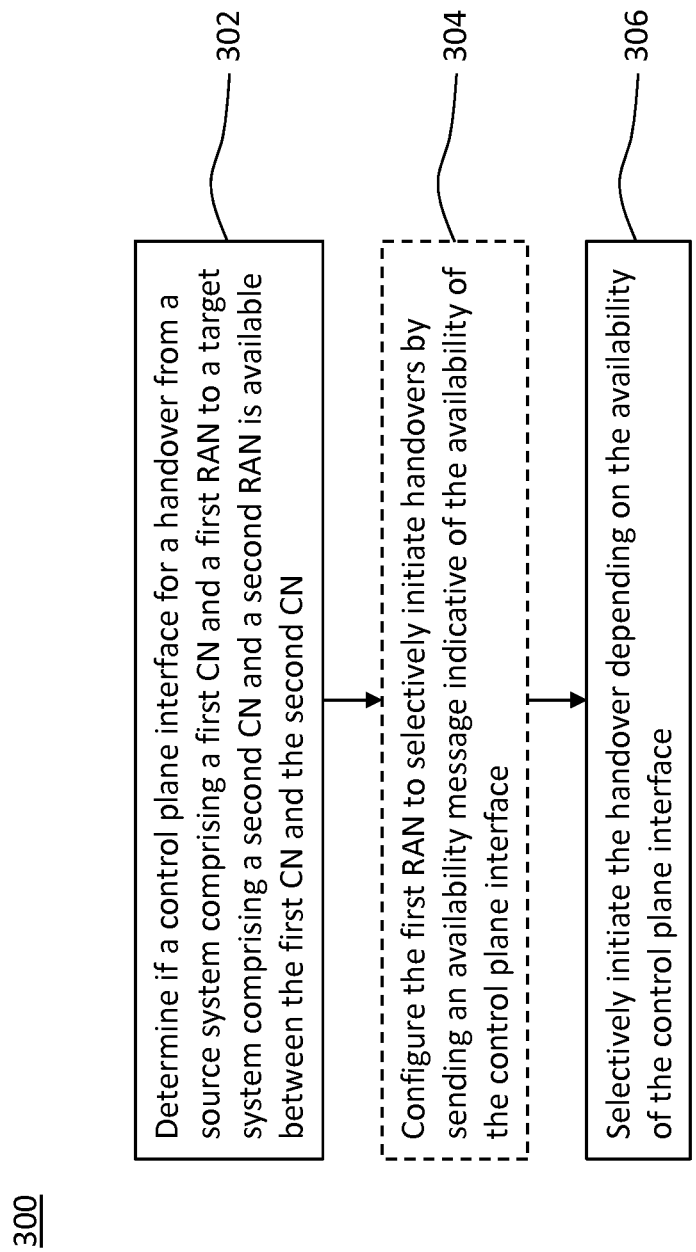
FIG. 3 shows a flowchart of a method embodiment for selectively initiating an inter-system handover, which may be implemented in a source core network.

FIG. 3 shows a flowchart for a method embodiment 300 of selectively initiating a handover from a source system comprising a first CN and a first RAN to a target system comprising a second CN and a second RAN. The method 300 comprises or triggers a step 302 of determining if a control plane interface for the handover is unavailable between the first CN and the second CN; and a step 306 of selectively initiating the handover depending on a result the determining step 302.

The determining step 302 may trigger, or the selectively initiating step 306 may include, a step 304 of sending an availability message indicative of the result the determining step 302 to the first RAN.

The device 100 may perform the method 300. The method 300 may be performed by the device 100, e.g., at or using the first mobility entity of the first CN. For example, the modules 102, 104 and 106 may perform the steps 302, 304 and 306, respectively.

Figure 4:
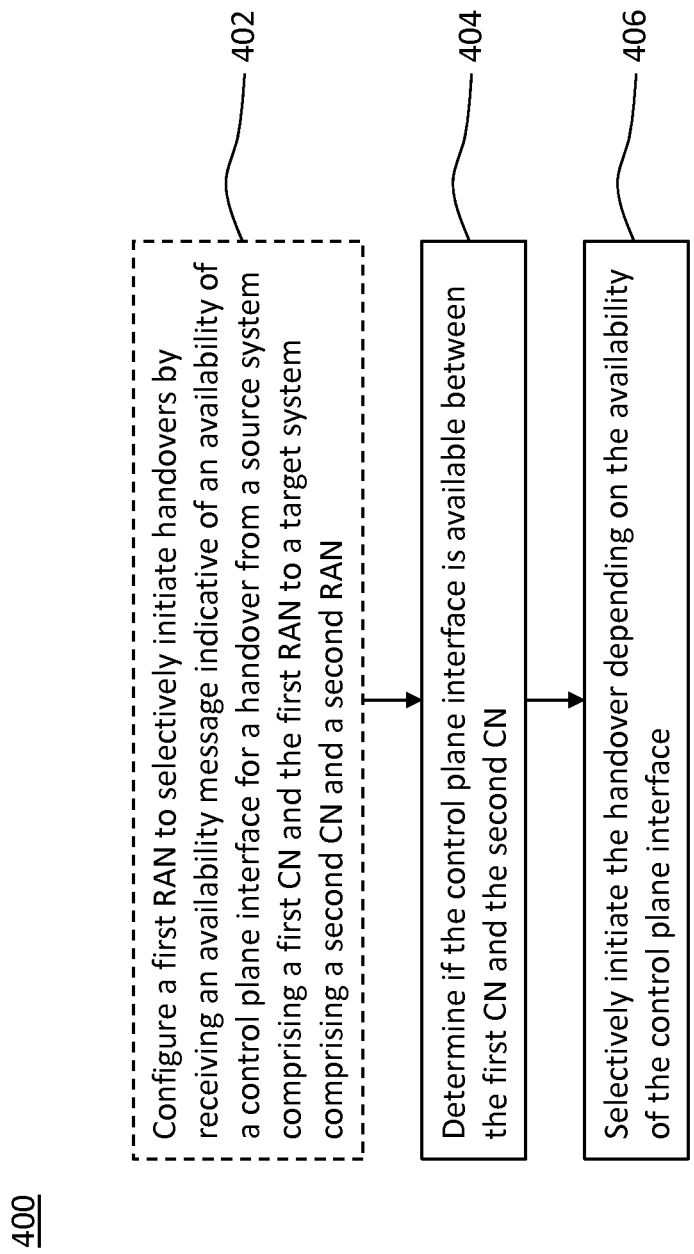
FIG. 4 shows a flowchart of a method embodiment for selectively initiating an inter-system handover, which may be implemented in a source access network.

FIG. 4 shows a flowchart for a method embodiment 400 of selectively initiating a handover from a source system comprising a first CN and a first RAN to a target system comprising a second CN and a second RAN. The method 400 comprises or triggers a step 404 of determining if a control plane interface for the handover is unavailable between the first CN and the second CN; and a step 406 of selectively initiating the handover depending on a result the determining step 404.

The determining step 404 may be based on, or may include, a step 402 of receiving an availability message indicative of unavailability.

The device 200 may perform the method 400. The method 400 may be performed by the device 200, e.g., at or using a base station of the first RAN. For example, the modules 202, 204 and 206 may perform the steps 402, 404 and 406, respectively.

Any of the modules of the device 100 and the device 200 may be implemented by units configured to provide the corresponding functionality.

The technique is outlined on the example of an inter-RAT handover and the example of source and target systems interworking between EPS/LTE and 5GS. However, the technique may be implemented for any inter-RAT handover or any inter-system handover between interworking systems, e.g., wherein a scenario of unavailability of (e.g., no support for) the control plane interface for exchanging information as to the handover between the RATs or systems is applicable.

The technique may be implemented based on the following steps. As a result of the step 302 or 404, the first CN (e.g., an AMF or an MME as the first mobility entity) of the source system is aware that it is not configured with the interface supporting the control plane with the second CN (e.g., an AMF or an MME as the second mobility entity) of the target system other than the source system, e.g. between 4G and 5G.

In a first option, which is compatible with any embodiment or implementation, at the configuration of a RAN interface between the first CN (e.g., the MME or the AMF as the first mobility entity) and the first RAN (e.g., an eNB or an gNB as a node of the RAN), i.e. the S1 interface or the N2 interface (sometimes also referred to as NG-C), the first CN informs the first RAN in the availability message about whether the first CN supports the control plane interface to another system as the target system. The target system may be expressly indicated in the availability message and/or the availability may be indicated without identifying the target system. For example, the availability may be expressed as which type of one or more RATs are supported and/or are candidates for handover.

In a second option, which is compatible with any embodiment or implementation, the Handover Restriction List (HRL) as the availability message is extended such that the first CN (e.g., the MME or the AMF as the first mobility entity) indicates in the HRL to the first RAN (e.g., the eNB or the gNB as base stations of the first RAN) that connected mode mobility is not supported to one or more specific RATs connected to the second CN. For example, the AMF indicates in the HRL sent to the gNB that connected mode mobility to E-UTRAN as the second RAN connected to an Evolved Packet Core (EPC) as the second CN is not supported.

In a third option, which is compatible with any embodiment or implementation, the first RAN is configured in the step 402 from an Operations, Administration and Management (OAM) system and/or according to an OAM protocol about handover restrictions for mobility involving a change of the CN. In particular, the OAM system may configure the first RAN with instructions on whether handover from the first RAT (e.g. LTE) connected to the first CN (e.g. the EPC)

to the second RAT (e.g. NR) connected to the second CN (e.g. a Next Generation Core or NGC) is allowed or restricted.

In a fourth option, which is compatible with any embodiment or implementation, the availability message is sent when setting up a context of the radio device (e.g., the UE), e.g., at creation of a UE context in a RAN node (e.g., the base station) of the first RAN. The first CN includes in the signaling to the RAN information about whether the UE should be subject to inter-CN mobility procedures, e.g. inter-CN handover preparation, or whether such mobility should be prevented, optionally in favor of other procedures. This availability information may form part of the UE context. Furthermore, the availability information may be transferred to the RAN node that serves the UE. For example, if the UE performs a handover the information is transferred to the target RAN node.

Based on the information received from the first CN in the availability message, the first RAN will not trigger a handover via the first CN (e.g. the S1 handover from 4G to 5G, or the N2 handover from 5G to 4G.

Optionally, instead of initiating the handover when no control plane interface to the target system (e.g., providing the other RAT) is supported, the source RAN may use an RRC procedure to release the UE from the serving first RAN. Before such release occurs the first RAN may configure the UE with information required to re-select another RAT or a cell in another RAT, thus minimizing the service interruption time and the impact on the end-user QoE.

Prior to releasing and redirecting the UE to a different RAT, served by a different CN, the serving first RAT may check, e.g. based on measurement reports of the UE, if other RATs are in coverage. If no other RAT is available to redirect the UE, the serving first RAT may decide to release the UE with an extended time within which the UE shall not return to the serving first RAT and/or to handover the UE to any other available cells of a RAT for which a change of the first CN is not needed. Alternatively or in addition, the first RAN may extend its own coverage in order not to trigger a radio link failure (RLF) for the UE.

Figure 5:
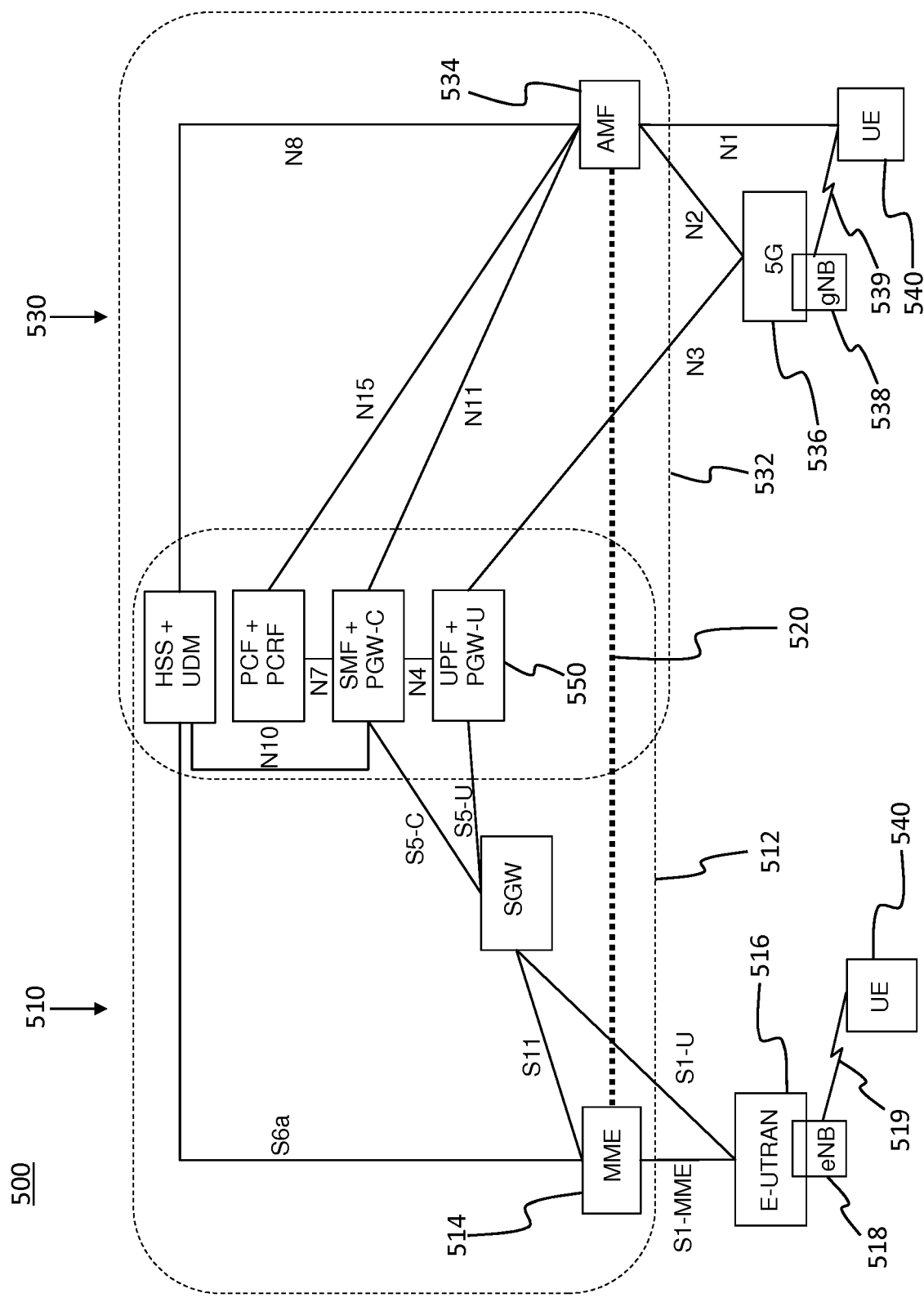
FIG. 5 shows a schematic block diagram of an exemplary system environment for the technique.

FIG. 5 shows a schematic block diagram of an exemplary system environment, in which any embodiment may be implemented. The source system 510 comprises the first CN 512 with the first mobility entity 514. The source system 510 further comprises the first RAN 516 with at least one base station 518 configured to provide radio access according to the first RAT 519 to the radio device 540. The target system 530 comprises the second CN 532 with the second mobility entity 534. The target system 530 further comprises the second RAN 516 with at least one base station 538 configured to provide radio access according to the second RAT 539 to the radio device 540.

The first CN 512 and the second CN 532 may be defined to include only the mobility entities 514 and 534, respectively. Alternatively, each of the CNs 512 and 532 may further comprise a gateway 520 for the user plane traffic and a data base, e.g., a Home Subscriber Server (HSS), containing user-related and subscriber-related information. The HSS may also provides support functions in the mobility management performed by the mobility entities 514 and 534. At least some of the nodes (e.g., nodes other than the first and second mobility entities 514 and 534) may be shared by the first and second CNs 512 and 532.

The technique can be applied in any interworking between systems having their data planes connected to the same packet-switched network (e.g., by sharing the gateway 520). The source and target systems 510 and 530 may include, e.g., any pair of a GSM systems supporting GPRS, UMTS systems optionally supporting HSPA, LTE systems and 5G systems (5GS or NGS, e.g. according to 3GPP). In the 5G system, the interworking between EPS and 5GS may be supported without having the interface 520 between the EPC and the 5G Core (5GC) available, e.g., without the control plane interface 520 between the MME and the AMF, which is indicated by a dashed line in in FIG. 5.

If the interface 520 is not available, the systems 510 and 530 may be referred to as a non-roaming architecture of interworking systems, e.g., for interworking between 5GS and EPC/E-UTRAN without the interface between the MME 514 and the AMF 534.

One implementation of the first option uses an S1 Setup procedure for the S1 interface (indicated in FIG. 5) as the availability message to inform the first RAN 516 of support (i.e., positive or negative availability) of the control plane interface 520. The availability may be expressed, e.g. as which type of RATs are supported and/or candidates for handover to the target system. The availability message may be sent by the MME 514 to the eNB 518 according to the document 3GPP TS 36.413 (e.g., Version 14.1.0). This example is only considered for simplicity. This implementation of the methods 300 and 400 is applicable to source system, in which a RAN-CN interface is configured in a way similar to the S1 Setup procedure. Examples of other systems for which the first option is readily implemented include the NGS as the source system (i.e., the NR RAN as the first RAN) with a RAN-CN interface that is setup according to a 3GPP procedure (e.g., a NG Setup procedure).

Figure 6:
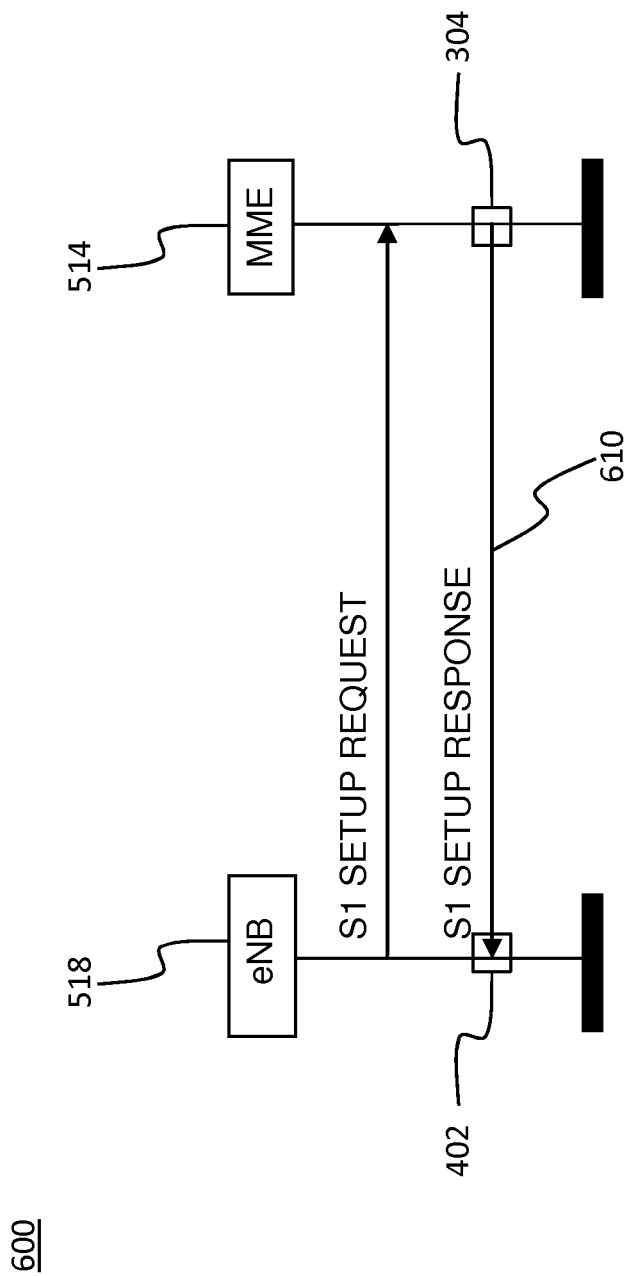
FIG. 6 shows a schematic signaling diagram resulting from a first implementation of the devices of FIGS. 1 and 2.

FIG. 6 schematically illustrates a signaling diagram 600 of the S1 Setup procedure. According to Clause 8.7.3.1 of the document 3GPP TS 36.413 (e.g., Version 14.1.0), the purpose of the S1 Setup procedure is to exchange application level data needed for the eNB 518 and the MME 514 to correctly interoperate on the S1 interface. The S1 Setup procedure is the first S1 Application Protocol (S1AP) procedure triggered after the Transport Network Layer (TNL) association has become operational. The S1 Setup procedure uses non-UE associated signaling.

The S1 Setup procedure erases any existing application level configuration data in the two nodes 514 and 518, and replaces the configuration data by the one received. The S1 Setup procedure also re-initializes the E-UTRAN S1AP UE-related contexts (if any) and erases all related signaling connections in the two nodes 514 and 518 like a Reset procedure would do. Optionally, the S1 Setup procedure clears MME overload state information at the eNB 518.

If the eNB 518 initiating the S1 Setup procedure (by sending an S1 Setup Request) supports a Closed Subscriber Group (CSG) cell, the S1 Setup procedure reports the one or more CSG IDs of the supported CSGs. In a variant of any implementation or embodiment, the negative availability of the control plane interface for the handover may be indicated by means of the CSG IDs.

The signaling 600 shown in FIG. 6 corresponds to a successful operation of the S1 Setup procedure, e.g., according to Clause 8.7.3.2 of the document 3GPP TS 36.413 (e.g., Version 14.1.0). The eNB 518 initiates the S1 Setup procedure by sending an S1 SETUP REQUEST message including the appropriate data to the MME 514. The MME 514 responds with a S1 SETUP RESPONSE message including the appropriate data, which may embody the availability message 610.

The exchanged data is stored in the respective node 518 and used for the duration of the TNL association. When the S1 Setup procedure is finished, the S1 interface is operational and other S1 messages can be exchanged.

FIG. 7 shows an example structure of the availability message 610, e.g., according to Clause 9.1.8.5 of the document 3GPP TS 36.413 (e.g., Version 14.1.0) defining the S1 SETUP RESPONSE message. If the eNB 518 initiating the S1 Setup procedure supports one or more CSG cells, the S1 SETUP REQUEST message contains the CSG IDs of the supported CSGs. The column "Presence" indicates whether the corresponding element is mandatory (M) or optional (O) in each S1 SETUP RESPONSE message.

If the S1 SETUP REQUEST message contains the Information Element (IE) of the name of the eNB 518 (eNB Name), the MME 514 may use this IE as a human readable name of the eNB 518. If the S1 SETUP RESPONSE message contains the IE of the name of the MME 514 (MME Name), the eNB 518 may use this IE as a human readable name of the MME 514. If an MME Relay Support Indicator IE is included in the S1 SETUP RESPONSE message, the eNB 518 considers this IE when selecting an appropriate MME 514 for the Relay Node.

The S1 SETUP REQUEST message may embody the availability message 610 by including a further IE 612, e.g., as indicated in the last row of FIG. 7. The IE 612 may be referred to as Inter CN Relocation to 5G Support Indicator. If the IE 612 is included in the S1 SETUP RESPONSE message 610, the eNB 518 considers this IE when selecting an appropriate procedure when the UE 540 needs to move into a 5G system as the target system 530. For example, the eNB 518 may determine to avoid triggering the handover procedures with CN involvement (i.e., via the first CN 512).

The availability message 610 may be sent according to the step 304 by the MME 514 and received according to the step 402 by the eNB 518 to transfer information for the TNL association.

Alternatively or in addition, the UE associated procedures may be used for implementing the availability message 610, e.g. Initial UE Context Setup, Handover signaling, etc.

An implementation of the second option uses the HRL as the availability message 610, e.g., according to Clause 9.2.1.22 of 3GPP TS 36.413 (e.g., Version 14.1.0). As shown in FIG. 8 for the inter-system handover from 4G to 5G, the MME 514 may send the HRL 610 including an indicator 612 of the (e.g., negative) availability to the eNB 518.

The HRL 610 may comply with an IE that defines roaming or access restrictions for subsequent mobility action for which the eNB 518 provides information about the target of the mobility action towards the UE 540, e.g., handover and Coverage and Capacity Optimization (CCO), or for Secondary Cell Group (SCG) selection during dual connectivity operation. If the eNB 518 receives the Handover Restriction List IE, the eNB 518 overwrites previously received restriction information.

A similar or equivalent HRL 610 may be sent by the AMF as the first mobility entity to the gNB as the base station of the first RAN for the inter-system handover from 5G to 4G. The HRL 610 may contain the information 612 that "E-UTRAN connected to EPC" is not supported for connected mode mobility (i.e., the handover).

An alternative or further implementation of the availability message 610 extends the meaning of the Forbidden inter-RAT IE in the HTL.

Figure 9:
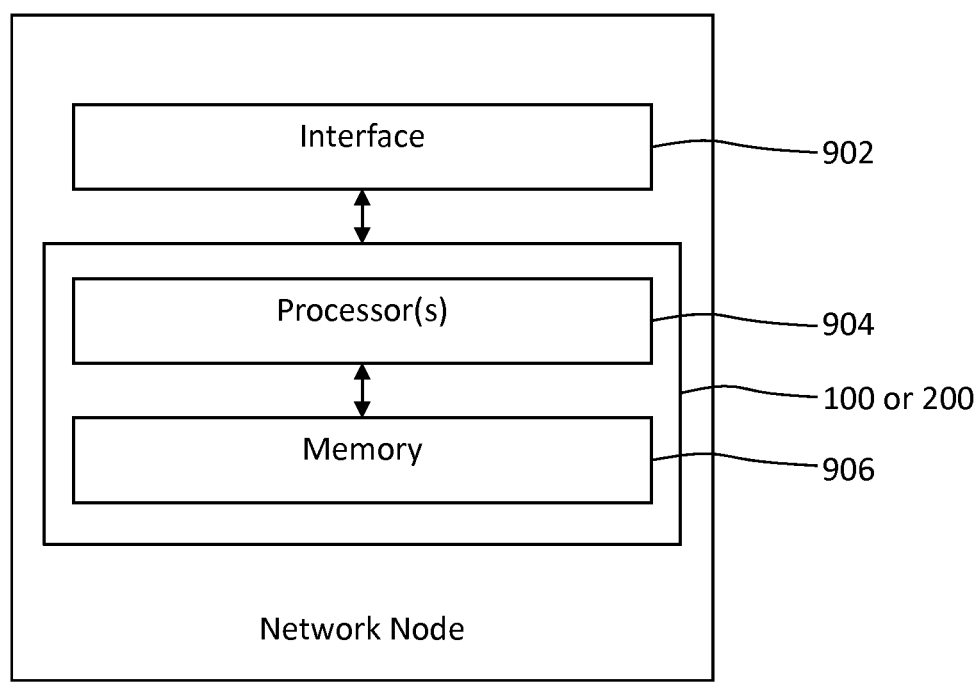
FIG. 9 shows a schematic block diagram of an embodiment of the device in a network node, which is combinable with embodiments and implementations of FIGS. 1 to 8.

FIG. 9 shows a schematic block diagram for embodiments of the devices 100 and 200 at the nodes 514 and 518, respectively. The devices 100 and 200 comprise one or more processors 904 for performing the method 300 and 400, respectively, and memory 906 coupled to the one or more processors 904. For example, the memory 906 may be encoded with instructions that implement at least one of the modules 102 to 106 and at least one of the modules 202 to 206, respectively.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100 or 200, such as the memory 906, network node functionality. For example, the one or more processors 904 may execute instructions stored in the memory 906. Such functionality may include providing various features and steps discussed herein, including any of the benefits disclosed herein. The expression "the device being operative to perform an action" may denote the device being configured to perform or trigger the action.

Figure 10:
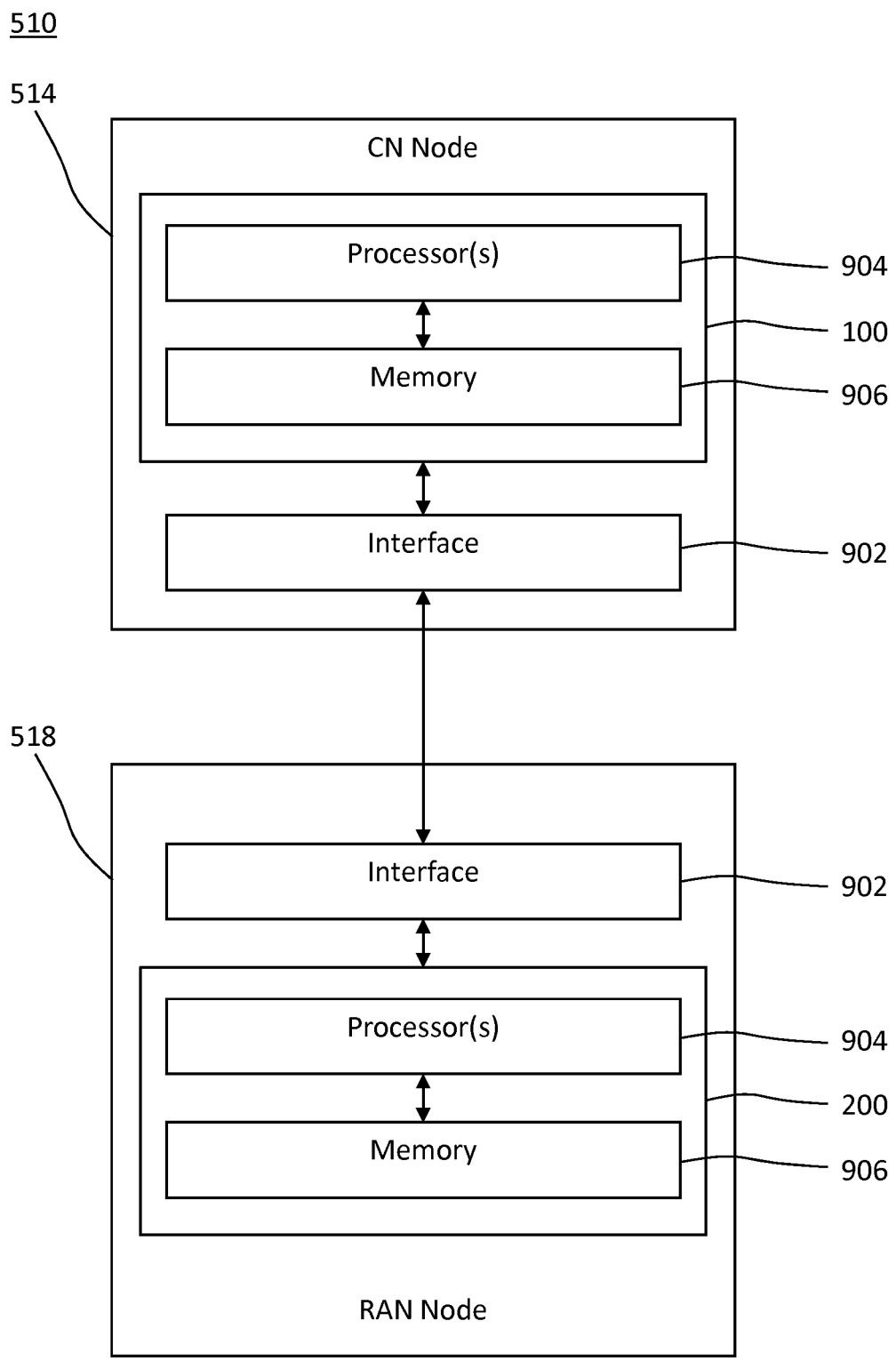
FIG. 10 shows a schematic block diagram of an embodiment of the device in multiple network nodes, which is combinable with embodiments and implementations of FIGS. 1 to 9.

As schematically illustrated in FIG. 9, the devices 100 and 200 may be embodied by the nodes 514 and 518, respectively. The nodes 514 and 518 comprise a RAN interface 902 coupled to the devices 100 and 200, respectively, for mutual communication, e.g., as schematically illustrated in FIG. 10.

In a variant, the functionality of the device 100 and/or the device 200 is (e.g., partly or completely) provided by one or more other nodes of the radio network (virtualization). That is, the one or more other nodes performs the method 300 and/or the method 400. The functionality of the device 100 and/or 200 is provided by the one more other nodes to the network node 514 and/or 518 via the interface 902 or a dedicated wired or wireless interface.

As has become apparent from above description, embodiments of the technique may improve inter-system handovers. The technique may be applied to inter-RAT mobility. The technique may control handovers through the CN.

The technique may prevent initiating the handover without the control plane interface between the respective core networks for exchanging the corresponding signaling. The selectivity whether or not to initiate the handover may relate to whether or not the control plane interface is available, respectively. The selectivity in initiating the handover may be applied only to CN handovers.

The technique enables the RAN to be aware of the possibility to trigger a successful inter-RAT handover via the CN and avoid failed handover attempts and prevent impact on end-user performance due to increased time for a UE being out of connectivity with the network.

Many advantages of the present invention will be fully understood from the foregoing description, and it will be apparent that various changes may be made in the form, construction and arrangement of the units and devices without departing from the scope of the invention and/or without sacrificing all of its advantages.

The invention claimed is:

1. A method of selectively initiating a handover from a source system comprising a first core network (CN) and a first radio access network (RAN) to a target system comprising a second CN and a second RAN, the method comprising:
   determining that a control plane interface for the handover is available between the first CN and the second CN, wherein the determining comprises receiving an availability message from the first CN indicating that the control plane interface for the handover is available, and wherein the availability message is based on an S1 setup procedure between the first RAN and the first CN; and initiating the handover responsive to the determining.

2. The method of claim 1, wherein the control plane interface connects or is required to connect a node of the first CN with a node of the second CN for the handover.

3. The method of claim 1, wherein the control plane interface connects or is required to connect a first mobility entity of the first CN with a second mobility entity of the second CN.

4. The method of claim 3, wherein the first mobility entity and/or the second mobility entity comprises a mobility management entity (MME) and/or an access mobility function (AMF).

5. The method of claim 1, wherein the source system and/or the target system comprises:
an Evolved Packet System (EPS);
a Next Generation System (NGS); and/or
a Fifth Generation System (5GS).

6. The method of claim 1, wherein the initiating the handover includes sending a handover message indicative of a handover request from the first CN through the control plane interface to the second CN.

7. The method of claim 6, wherein the first RAN is in a connected mode with a radio device and the handover message is indicative of a context of the radio device.

8. The method of claim 1, wherein the determining further comprises sending the availability message indicating the availability of the control plane interface for the handover to the first RAN.

9. The method of claim 8, wherein the availability message includes a Handover Restriction List that is indicative of the availability.

10. The method of claim 8:
wherein the availability message is sent to at least one base station of the first RAN; and/or
wherein the availability message is received from at least one mobility entity of the first CN.

11. The method of claim 8, wherein the availability message is sent and/or received upon configuring a RAN interface between the first CN and the first RAN or a base station of the first RAN.

12. The method of claim 8, wherein the availability message configures at least one of the first RAN or one or more base stations of the first RAN to send a handover required message that is indicative of the target system or the second RAN.

13. The method of claim 8:
wherein the availability is determined for a plurality of target systems; and
wherein the availability message indicates that the control plane interface for the handover is available with respect to the plurality of target systems.

14. The method of claim 1, wherein the first RAN is configured for radio access according to a first radio access technology (RAT) and the second RAN is configured for radio access according to a second RAT.

15. The method of claim 14, wherein the second RAT is different from the first RAT.

16. The method of claim 14, wherein the availability is determined for one or more target systems configured for radio access according to the second RAT.

17. The method of claim 16:
wherein the determining the availability of the control plane interface comprises sending the availability message indicating that the control plane interface for the handover is available to the first RAN; and
wherein the availability message is indicative of the availability for the second RAT.

18. A non-transitory computer readable recording medium storing a computer program product for selectively initiating a handover from a source system comprising a first core network (CN) and a first radio access network (RAN) to a target system comprising a second CN and a second RAN, the computer program product comprising software instructions which, when run on processing circuitry of a computing device, causes the computing device to:
determine that a control plane interface for the handover is available between the first CN and the second CN, wherein the determining the comprises receiving an availability message from the first CN indicating that the control plane interface for the handover is available, and wherein the availability message is based on an S1 setup procedure between the first RAN and the first CN; and
initiate the handover responsive to the determining.

19. A device for selectively initiating a handover from a source system comprising a first core network (CN) and a first radio access network (RAN) to a target system comprising a second CN and a second RAN, the device comprising:
processing circuitry;
memory containing instructions executable by the processing circuitry whereby the device is operative to:
determine that a control plane interface for the handover is available between the first CN and the second CN, wherein the determining comprises receiving an availability message from the first CN indicating that the control plane interface for the handover is available, and wherein the availability message is based on an S1 setup procedure between the first RAN and the first CN; and
initiate the handover responsive to the determining.

* * * * *